Figure 1:
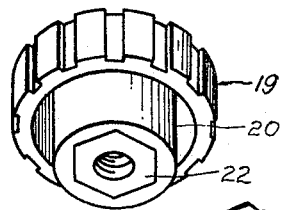
Figure 1:
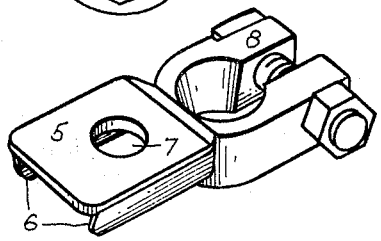
Figure 1:
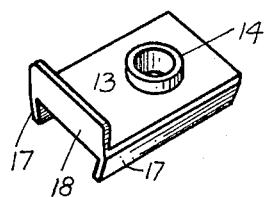
Figure 1:
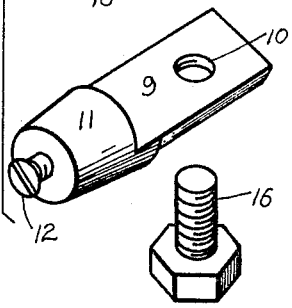

Nov. 22, 1966     J. J. BOSELEY     3,287,532
BATTERY SWITCH
Filed May 10, 1965

3,287,532
Patented Nov. 22, 1966

3,287,532
BATTERY SWITCH
Joseph James Boseley, 45–47 Meeks Road, Marrickville, near Sydney, New South Wales, Australia
Filed May 10, 1965, Ser. No. 454,622
1 Claim. (Cl. 200—158)

This invention relates to switches of the circuit isolating types for the batteries of cars, trucks, and the like, as well as those for launches and similar watercraft where standard vehicle batteries are used to supply electric power for starting and ignition and other purposes.

The invention has been devised to provide a novel isolating switch device of compact, simple and strong form, and of reliable construction capable of ready mass production at reasonable cost, and can be quickly fitted to an electric battery of the type before mentioned, and whereby the electric supply from the battery can be immediately isolated as in emergency, and thereby providing for safety should an electrical fault occur and preventing the battery from short circuiting. Also, if the horn control circuit of a vehicle should develop a fault, the uncontrolled sounding of the horn is prevented by shutting-off the supply current until adjustment is made.

A further advantage resides in the fact that the electric supply can be shut off while repair or maintenance work is carried out. Also, when a vehicle or launch or the like is left unattended, the battery being isolated, there is complete safety from electrical fire, and in the case of a launch or the like damage to metallic parts from electrolysis is obviated.

A still further and most important advantage resides in the fact that the device also acts as a protective measure against operation of the battery as hereinafter explained and thereby preventing theft of a vehicle or other subject to which the said device is fitted.

According to this invention the battery isolating switch device comprises two conducting bar members termed first and second bar members, placed one over the other with insulation between to insulate them one from the other, said first bar member having means for affixture to a battery terminal, post or other supply service, and the second bar member having means for connection to a supply cable or the like, a contact bolt rigidly secured to the second bar member and passing through an insulated orifice in the first bar member and having a threaded end projecting beyond said first bar member, and a contact making switch knob with a threaded orifice extending therethrough by which it is screwed onto the projecting end of the said contact bolt into or out of contact with the first bar member to effect the making or breaking of the electrical connection between the said bar members, said switch knob being removable from the threaded end of the projecting contact bolt so as to render the switch device inoperative and the electrical circuit broken until the said switch knob is replaced and tightened to establish the said circuit.

The contact making switch knob may be of electrical insulating material with a metallic contact making insert fitted in the underside thereof and having a threaded orifice passing therethrough for fitting on the contact bolt.

Figure 2:
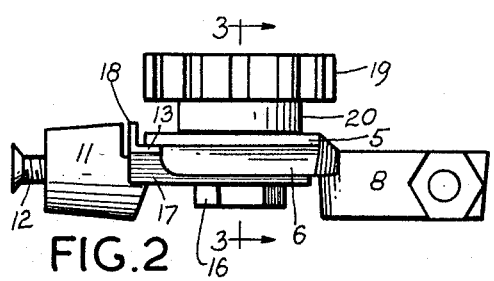
Figure 3:
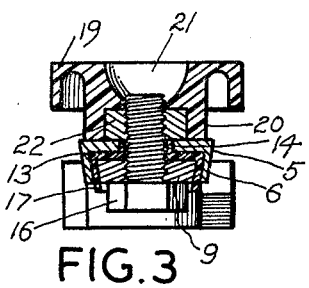
Figure 4:
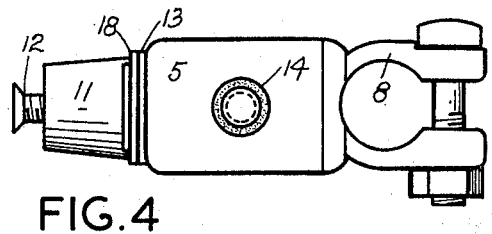

In order to describe the invention more fully, reference will now be made to the accompanying drawing in which a preferred construction of the battery isolating switch device is shown suited for general use, and wherein:

FIGURE 1 is an exploded perspective view showing all the parts of the isolating switch device separated, and FIGURE 2 is a side elevation of the said device, while FIGURE 3 is a transverse sectional elevation of same on line 3—3 of FIGURE 2, and FIGURE 4 is a plan with the switch knob removed.

The first bar member 5 is of flat form with two opposite downturned side flanges 6 presenting a longitudinal channel between them and has an orifice 7 located near the centre thereof, and at one end a battery terminal 8 of usual type for securing to the post of a battery is formed integral therewith.

The second bar member 9 is of flat plate form of a width to fit in the channel of the first bar member 5, and has a threaded orifice 10 therein of smaller size than the orifice 7 in first bar member 5 the reason for which will be later explained, and there is an integral boss 11 at one end fitted with a securing screw 12 in a threaded orifice in said boss 11.

The insulation between the first and second bar members 5 and 9 in this example consists of an insulating plate 13 of suitable plastic material of a width to fit neatly under the first bar member 5 in the longitudinal channel thereunder between its side flanges 6 and it has an integral collar 14 which passes through the hole 7 with its top portion flush with the top surface of the said first bar member 5 or may be slightly undercut, and its position will be appreciated from FIGURE 3. The bore of the collar 14 which continues through the insulating plate 13 is of a size to neatly slide over the contact bolt 15. Said insulating plate 13 has side flanges 17 which fit over the sides of the second bar member 9 and thereby provide an insulating covering about the sides thereof. At the end of said insulating plate 13 adjacent the boss 11 there is a transverse shield flange 18 which prevents the risk of any short circuiting of the adjacent end of the first bar member 5.

The first and second bar members 5 and 9 being assembled one over the other with the insulating plate 13 fitted between as seen in FIGURES 2, 3 and 4, the insulating collar 14 passing through orifice 7 in register with the bore of said collar 14 and the contact bolt 16 being threaded throughout its length is screwed through the threaded orifice 10 until its head abuts the underside of second bar member 9 so that it is rigidly affixed in place thereto passing through said collar 14 which keeps it electrically insulated from said first bar member 5 for receiving thereon the switch knob 20 which will now be described.

The switch knob 20 is formed of plastic insulating material having an outer or top cavity therein to afford clearance (when in place) to the outer end of the contact bolt 16 and there is a solid depending boss 21 with a central cavity 22 in the underside in which a contact block of nut form is moulded with the outer face of said block in line with the end face of the boss 21 or said block may protrude a small distance out therefrom. This contact block 23 is of good electrical conducting metal and is threaded in its central orifice to suit the contact bolt 16 on which it screws when the switch knob 20 is tightened in place and abuts the surface of the first bar member 5 clear of the collar 14 and so establishes electrical connection between the bars 5–9.

The rim of this switch knob 20 is notched so as to form a finger grip to facilitate manipulation, and the top or outer face may bear directions thereon as to manipulation as for example "on" and "off" whereby contact can be made or broken. Arrows or other markings may be included to indicate the direction of turning.

As will be appreciated from the drawings, particularly FIGURE 3 the switch knob 20 can be readily screwed off the contact bolt 16 and taken away by a user thereby not only isolating the battery but rendering the switch device inoperative until the said switch knob is replaced. By providing for removal of this switch knob 20 the switch acts as an effective means of protection against theft. If said switch knob was permanently attached to the switch bolt 16 it would merely act as an isolator switch readily operative at all times and afford no security against operation of a vehicle or other subject to which the device is fitted, and so afford no protection against unauthorised use or theft.

While one example of the invention has been described in connection with the drawings it is to be understood that the switch device is not confined to the precise form of the terminal means of the bar member 5-9 as such ends may be formed to suit other requirements whereby the said switch device is interposed in the circuit of an electrical supply circuit or system, and the device may not be connected direct to a battery but connected by cable or other suitable means and located at an appropriate position for convenience of operation.

I claim:

A battery isolating switch device comprising two conducting bar members termed first and second bar members, placed one over the other with insulation between to insulate them one from the other, said first bar member having means for a fixture to a battery terminal, post or other supply source and the second bar member having means for connection to a supply cable or the like, a contact bolt rigidly secured to the second bar member and passing through an insulated orifice in the first bar member and having a threading thereon with the end projecting beyond said first bar member, and a contact making switch knob with a threaded orifice extending therethrough by which it is screwed onto the projecting end of the said contact bolt into or out of contact with the first bar member to effect the making or breaking of the electrical connection between the said bar members, said switch knob being removable from the threaded end of the projecting contact bolt so as to render the switch inoperative and the electrical circuit broken until the said switch knob is replaced and tightened to establish the said circuit, the first bar member having downturned side flanges extending lengthwise thereof and forming a channel under said first bar member in which the second bar member is fitted with the insulation interposed between the adjacent faces of said bar members, the orifices in said bar members being arranged in register, and also with an orifice in said insulating material and through which orifices the said contact bolt passes, the insulation consisting of a plate of insulating material formed to fit between the downturned side flanges of the first bar member, the plate of insulating material having downturned flanges at opposite sides to extend over the adjacent side edges of the second bar member, the plate of insulating material having a collar extending from one face and positioned to fit through the orifice in the first bar member to insulate the contact bolt therefrom, and a transverse upturned shield flange at the end where connection is to be made to a supply cable or the like.

References Cited by the Examiner
UNITED STATES PATENTS

| | | | |
|---|---|---|---|
| 895,977 | 8/1908 | Dawber. | |
| 1,175,651 | 3/1916 | Marko | 339—224 X |
| 1,675,114 | 6/1928 | Laird | 200—158 |
| 2,145,041 | 1/1939 | Childers | 200—158 |
| 2,674,674 | 4/1954 | Rietschel | 200—158 |
| 2,801,399 | 7/1957 | Dunn et al. | 200—52 X |

BERNARD A. GILHEANY, *Primary Examiner.*

H. A. LEWITTER, *Assistant Examiner.*